Nov. 15, 1938.　　　　W. OWEN　　　　2,137,117
PROCESS FOR MAKING SHEET GLASS
Filed Oct. 31, 1936　　　3 Sheets-Sheet 1

INVENTOR.
WILLIAM OWEN
BY Bradley Bee
ATTORNEYS.

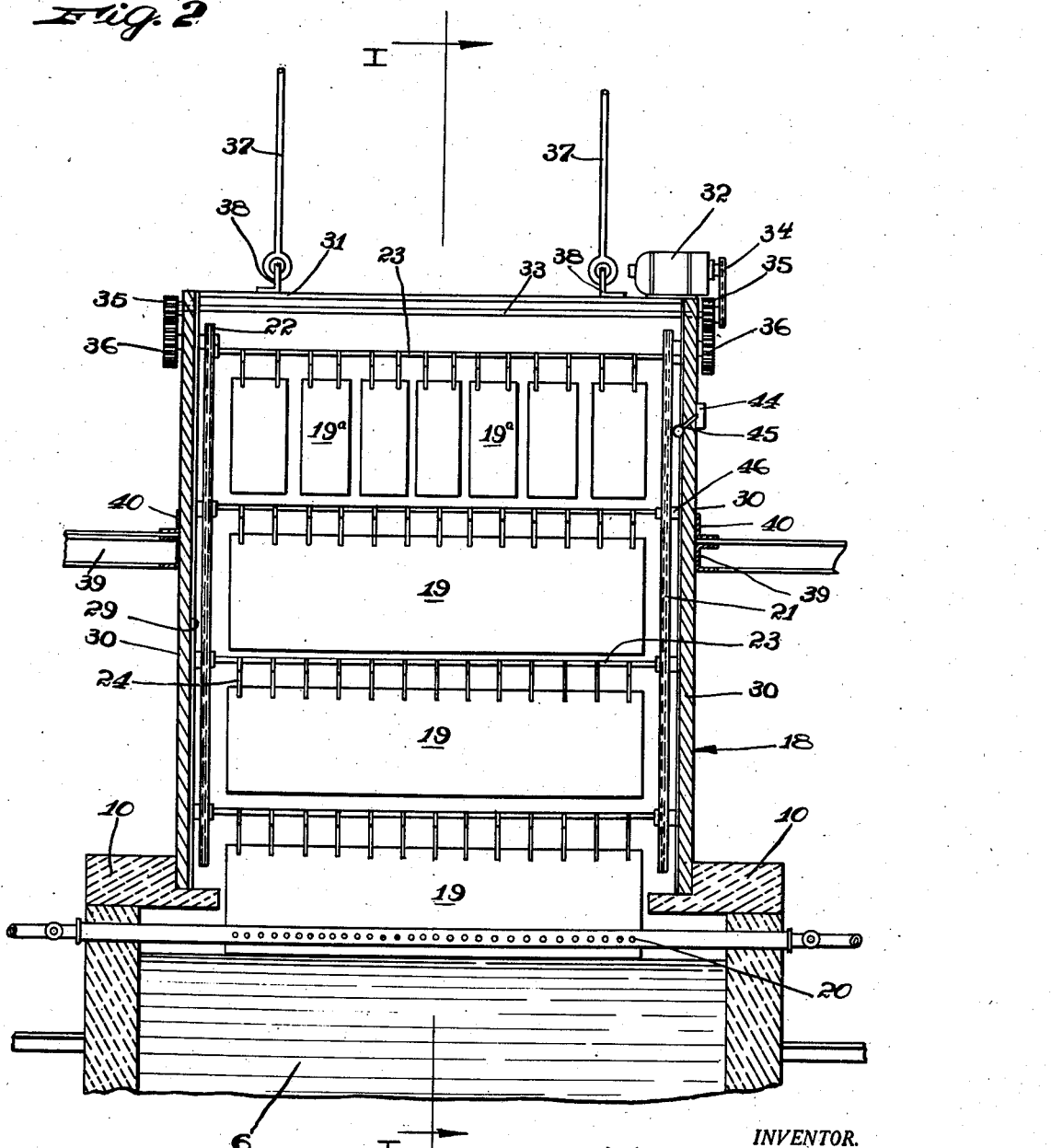

Nov. 15, 1938.  W. OWEN  2,137,117
PROCESS FOR MAKING SHEET GLASS
Filed Oct. 31, 1936  3 Sheets-Sheet 3
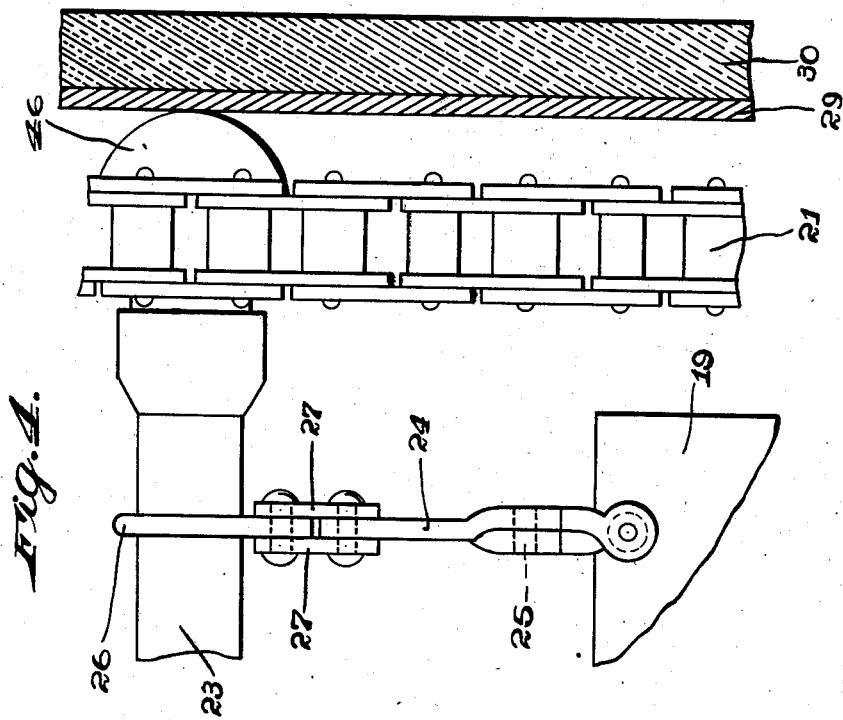
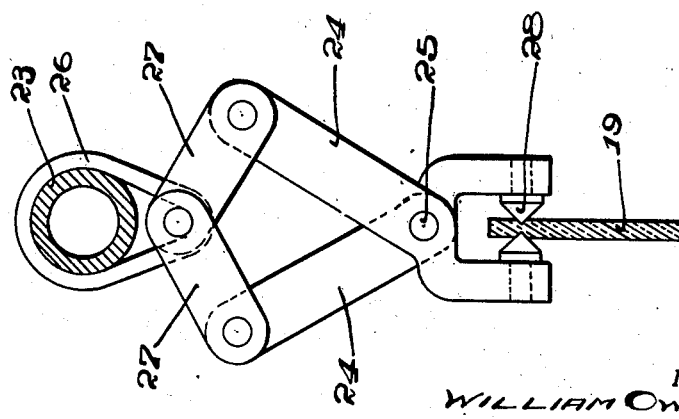
INVENTOR.
WILLIAM OWEN
BY Bradley & Ber
ATTORNEYS.

Patented Nov. 15, 1938

2,137,117

UNITED STATES PATENT OFFICE 2,137,117

PROCESS FOR MAKING SHEET GLASS

William Owen, Pittsburgh, Pa., assignor to Pittsburgh Plate Glass Company, Allegheny County, Pa., a corporation of Pennsylvania Application October 31, 1936, Serial No. 108,651

2 Claims. (Cl. 49—83.1)

The invention relates to a process for making sheet glass and involves a modification of the process and apparatus of Arthur D. Nash, Serial No. 91,066, filed July 17, 1936. It relates primarily to an improved means for supplying a layer of colored glass to a bath of clear glass so that the sheet drawn or flowed from the bath consists of two layers, one of clear glass and the other of colored glass. In the Nash application above referred to, the colored glass or frit is supplied to the bath of clear glass in divided or crushed form, while the present procedure avoids the step of reducing the colored glass to divided form and involves the use of colored glass in sheet form, each sheet being fed slowly downward and progressively reduced to molten condition as it approaches or strikes the molten bath. Glass produced by the use of this coloring layer has a somewhat smoother finish than that produced when crushed glass is used to provide the colored layer. The invention is illustrated in connection with the production of window glass by a drawing process, but it will be understood that the procedure is equally applicable to the production of plate glass, wherein the sheet produced is flowed or otherwise withdrawn from a tank and sized as described and illustrated in the application referred to above. One embodiment of the apparatus is illustrated in the accompanying drawings, wherein:

Fig. 2 is a section on the line II—II of Fig. 1. And Figs. 3 and 4 are enlarged detail views illustrating the glass supporting means.

Figure 1:
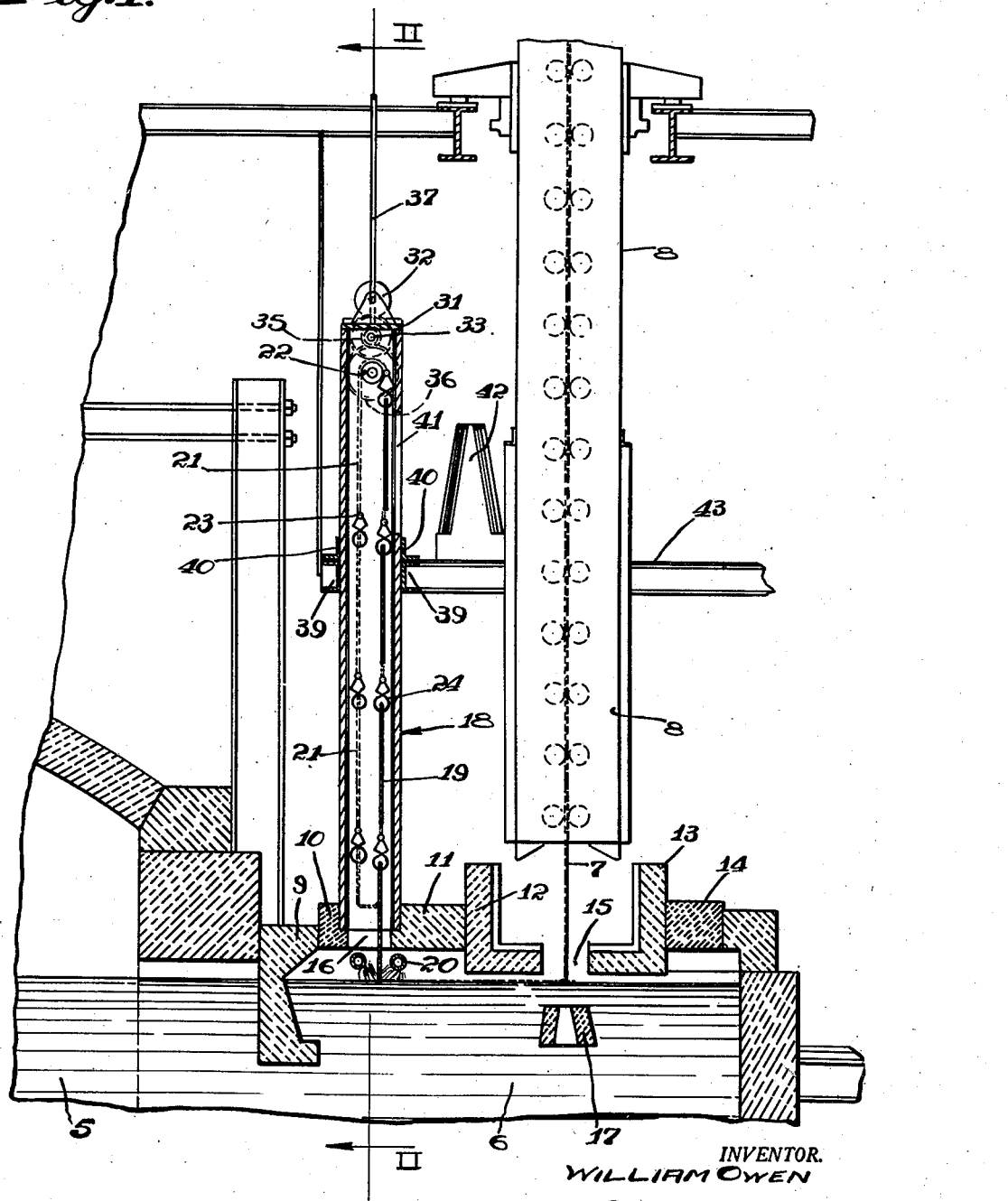
Figure 1 is a section on the line I—I of Fig. 2.

Referring to Figs. 1 and 2, 5 is the end of a glass melting tank of the regenerator type and 6 is a forehearth from which the glass sheet 7 is drawn continuously through the Fourcault leer 8, leers of this type being well known in the art. The glass is cut into sections and removed at the top of the leer. The top of the forehearth is covered by the refractory members 9, 10, 11, 12, 13 and 14, which are arranged so as to provide the two openings 15 and 16 for the drawing of the sheet 7 and for the application of the layer of colored glass, as later described. The usual draw bar 17 is provided beneath the line of draw of the glass sheet, while the lower portion of the member 9 acts as a skimmer for the glass passing from the tank to the forehearth 6.

Mounted above the opening 16 is a casing 18, in which is mounted an endless carrier for lowering a series of colored sheets 19 through the opening 16 where they are exposed to heat sufficient to melt them as they are gradually moved downward. The glass sheets 19 may be of any desired color and are preferably of substantially the same composition as the clear glass bath in the tank beneath aside from the fact that they contain the necessary coloring ingredient. The specific gravity of the glass in these sheets is necessarily no greater than that of the glass in the tank, since the process requires that the colored glass supplied to the bath shall float upon its surface and if a heavy colored glass were used, it would tend to sink beneath the surface and become dissipated through the tank, although this tendency is resisted materially by the surface tension of the bath.

The fusion of the colored sheets at their lower edges as they are moved slowly downward is promoted by the use of a pair of gas burners 20 extending across the forehearth just above the surface of the bath and provided with openings to promote the projection of the combustible gas against the lower edge of the sheet 19 close to the surface of the bath. The colored glass which is thus fused from the sheet is deposited upon the surface of the bath, spreads out thereon, and moves forward to the point of formation of the sheet, since in an apparatus of this character, the sheet 7 is drawn from the surface glass of the bath so that there is a flow at the surface of the bath toward the line of draw of the sheet. This flow of surface glass constitutes the main body of the sheet, although some glass is incorporated into the central portion due to a direct upward flow from a point in the bath lying in the plane of the sheet. The fluid glass from the sheet 19 which is deposited in the bath has some tendency to flow laterally, so that it is not necessary that the sheets 19 should equal in width the sheet 7 which is being drawn, although it is desirable that the sheets 19 should have a width which is not greatly less than the width of the sheet 7.

The endless carrier which lowers the glass sheets 19 to the bath is made up of a pair of chains 21 passing at their upper ends over sprockets 22. These chains are connected at intervals by means of hollow bars or pipes 23 which support the tongs for engaging the upper edges of the glass sheets. These tongs are made up of the pairs of arms 24, pivoted together at 25 (Figs. 3 and 4) and connected to the loops 26 by means of the toggle arms 27. The lower ends of the arms 24 are provided with conical teeth 28 for engaging suitable recesses formed adjacent the upper edge of the sheet to be supported. As shown in Fig. 2, the sheets which are lowered by the carrier may be single sheets, as indicated by the numerals 19, 19, or may be made up of a series of sections, as indicated at 19a. In the latter case a plurality of different colored sheets may be used, if desired, so that a ribbon effect is secured upon the sheet 7. No sprocket is employed at the lower end of the endless carrier, the chains merely reversing themselves at this point as they begin their upward movement.

The casing 18, in which the endless carrier is mounted, is preferably made up of metal plates 29 covered by a suitable insulating layer 30. The plates 29 are connected at their upper ends by a metal cap 31 and on this cap is mounted the casing 32 which carries the motor for operating the carrier, and also suitable reducing gearing, as the movement of the carrier is necessarily very slow. The shaft of the reducing mechanism carries a sprocket which drives a second sprocket on the transverse shaft 33 through the intermediary of the chain 34. This shaft 33 carries at its end the pinions 35, 35 which drive the spur gears 36, 36. These spur gears are keyed to the ends of a pair of short shafts, which are journalled in the casing and carry at their inner ends the sprockets 22, 22 over which the carrier chains pass. In order to provide for the removal of the casing 18 and the parts carried thereby, an overhead lift (not shown) is employed, terminating in the cables 37, 37 which are looped at their lower ends through brackets 38, 38 secured to the cap member 31 of the casing. It is thus possible to raise the casing and the parts carried thereby as a unit, and remove it to a point remote from the tank, when it is desired to discontinue the formation of a colored sheet and revert to the production of ordinary colorless window glass. When the casing is in position of use, as illustrated in Figs. 1 and 2, its weight is preferably borne by the superstructure comprising the channels 39, 39 (Fig. 2), this being accomplished by the use of a pair of angle brackets 40, 40 secured to the casing 18 and resting upon the channels 39, 39.

In order to attach the plates 19 to the gripping devices, the casing is left open, as indicated at 41 in Fig. 1, and the glass sheets are brought to a point opposite this opening on the racks 42, the balcony floor 43 being provided at this elevation along which the trucks are moved which bring the racks to position opposite the carrier.

In operation the downward movement of the glass sheets 19 is necessarily relatively slow, as the sheet is exhausted by the melting away of its lower edge, but in order to speed up the movement of the carrier in shifting from cne plate to the next above, means are preferably provided for automatically increasing the speed of the motor at these periods. This is preferably accomplished by the use of the relay switch 44 (Fig. 2) which has an arm 45 in position to be engaged by suitable cams 46 (Fig. 4) located at intervals along the length of one of the carrier chains. By the use of suitable auxiliary mechanism, well known to those skilled in the electrical art, it is possible by this means to speed up the movement of the carrier when one of the sheets is exhausted, and then shift back to a lower speed when a new sheet is brought to position so that its edge is acted upon by the burners 20. The fusing of the glass sheet is started very quickly after it approaches the burners 20 due to the fact that the casing lying above the opening 16 in the arch of the tank is closed and insulated, thus insuring that the sheets will achieve a temperature approximating the softening point before their lower edges reach the burners 20. Under these conditions fusion occurs very quickly due to the combined action of the burners and of the heat from the glass bath, the temperature beneath the arch being sufficiently high to cause glass to fuse if exposed for a sufficient time, even without the use of burners. The use of the burners facilitates the more rapid fusion of the colored sheets so that a thicker coating of colored glass is applied to the surface of the bath. The coating of colored glass is in any case very thin, so that one sheet of colored glass having a width of three or four feet will supply sufficient coloring material to take care of several hundred feet of glass in the finished sheet 7. The colored layer as applied to the sheet 7 under the procedure as above described constitutes an integral portion of the sheet and is not subject to crazing or weathering. It also gives a surface which is comparable as to fire polish or finish with that produced in making a sheet of ordinary window glass.

What I claim is:

1. A method of making a glass sheet which consists in withdrawing a sheet of glass from a bath of molten clear glass in such manner that the surface layer of the bath moves forwardly relative to the body of glass therebeneath and is incorporated in the sheet, and feeding downwardly to the surface of the bath at a slow uniform speed and in a vertical position adjacent the point of formation of said sheet, a sheet of colored glass in such manner that the edge of the colored sheet is progressively melted away as it descends and forms a layer imposed on the surface of the clear glass which is incorporated into the withdrawn sheet so that such sheet comprises a layer of clear glass and a layer of colored glass.

2. A method of making a glass sheet which consists in withdrawing a sheet of glass from a bath of molten clear glass in such manner that the surface layer of the bath moves forwardly relative to the body of glass therebeneath and is incorporated in the sheet, feeding downwardly to the surface of the bath at a slow uniform speed and in a vertical position adjacent the formation of said sheet a sheet of colored glass, and applying heat to the descending edge of the colored glass sheet in such manner that it is progressively fused at its lower edge as it descends and forms a top layer imposed on the forwardly moving surface of the bath which becomes incorporated into the withdrawn sheet so that such sheet comprises a layer of clear glass and a layer of colored glass.

WILLIAM OWEN.